Patented Aug. 7, 1951

2,563,493

UNITED STATES PATENT OFFICE 2,563,493

SULFONATED 3,7-DIAMINODIBENZOTHIO-PHENE DIOXIDES

Mario Scalera, Somerville, and Dale R. Eberhart, Middlesex, N. J., assignors to American Cyanamid Company, New York, N. Y., a corporation of Maine No Drawing. Application June 15, 1950, Serial No. 168,392

7 Claims. (Cl. 260—329.3)

This invention is concerned with optical bleaching and brightening and especially with new derivatives of benzothiophene distinguished by their remarkable utility for this purpose. More specifically the invention realtes to water-soluble derivatives of acylated 3,7-diaminodibenzothiophene dioxides and their use.

In particular, the invention utilizes a novel group of compounds which are sulfonated derivatives of compounds containing the nucleus:

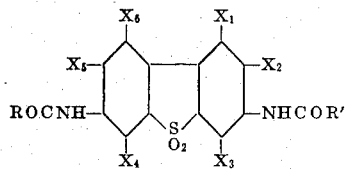

in which R and R' are radicals of the aliphatic and aromatic series and $X_1$, $X_2$, $X_3$, $X_4$, $X_5$ and $X_6$ represent H, alkyl, alkoxy or halogen radicals, but at least one of said $X_1$, $X_2$, $X_3$, $X_4$, $X_5$, and $X_6$ being a hydrogen radical. As such, the present application constitutes a continuation-in-part of our copending application Serial No. 45,425, filed August 20, 1948.

It is well known that cellulosic materials tend to develop an undesirable yellowish cast with age. Unfortunately it cannot be removed by ordinary simple bleaching or scouring. Development of this yellowness is aggravated among other reasons, by continued exposure to light, weathering and repeated launderings. It is, therefore, particularly troublesome in plastics and textile fabrics that must be subjected to these conditions.

For many years, it has been the practice to attempt to conceal this yellowing by the use of blue pigments or dyes, to neutralize the complementary yellow color of the cellulose. For this purpose, the use of blue pigments, such as ultramarine or alkali blue, or of fugitive blue dyestuffs, has become common practice in paper manufacture and laundry operations.

While these blue coloring matters are often temporarily effective, they are subject to serious disadvantages. For example, addition of a blue color to a yellow does not produce pure white, but rather a gray. The greater the intensity of the original yellow, the more bluing necessary to hide it, and the darker in cast the resulting gray. Further, unless an exact color balance is struck, the finished product is not even gray but may actually be blue.

In 1929, P. Krais (Mellianel's Textilberichte, 1929—pp. 468-9) suggested using not a blue coloring matter to absorb yellow light, but aesculin, a fluorescent substance capable of emitting blue light. Thus, the yellowing effect, which consists in absorbing the blue light, is truly destroyed by a substance which emits the blue light lost, resulting in true white instead of gray.

No widespread acceptance of this proposal occurred. This was largely due to the lack of acceptable materials. To be suitable for this purpose, a compound should possess the properties of being:

1. Colorless in white light;
2. Strongly fluorescent under the influence of ultra-violet rays such as are present in sunlight;
3. Fluorescing blue-white;
4. Sufficiently substantive to be absorbed from very low concentrations;
5. Resistant to common agents such as soap, chlorine, and light;
6. Free from the tendency to decompose to colored products;
7. Reasonably low in cost of production in proportion to effectiveness;
8. Free from tendency to discolor soap or detergents when incorporated therein.

Aesculin, suggested by Krais, fails completely as to 4 and 5 and badly as to 7. None of the available materials were suitable in all of these properties. It was particularly difficult to satisfy the third, fourth, fifth and eighth requirements.

It is, therefore, a principal object of the present invention to develop new compounds suitable for use as optical bleaching agents and combining the above-listed properties. This object has been found to be accomplished, with an effectiveness both surprising and unpredictable, in the sulfonic acids of acylated 3,7-diaminodibenzothiophene dioxide and its nuclear substitution products. These compounds combine to an amazing degree the various desirable properties of affinity, high strength, physical and chemical stability, substantivity, and fluorescent hue. Since current theories of substantivity and fluorescence are somewhat vague, the present invention is not restricted to any particular theory of action.

The compounds herein disclosed will effectively neutralize the yellowness of cellulosic textiles even when applied from very minute concentrations. On the other hand, they can be applied from relatively concentrated solution when it is desired to produce greatly enhanced whiteness and brilliance of discharge effects. The application of these agents may be carried out in a separate rinse bath; or they may be used in conjunction with the soaping operations; or the agents may be incorporated in the soap or detergent and marketed in that form to enhance the cleansing and whitening action of said detergent. The latter, in fact, is one of the preferred modes of utilization of our compounds, which are particularly suited for marketing in this manner, in admixture with detergents.

The compounds of the present invention possess a valuable property not shared with most other whitening agents which have been proposed in the art for similar purposes. They do not cause a discoloration of the detergent itself when mixed therewith.

Many brighteners of other types, which are excellent in their whitening effect on the cloth to which they are eventually applied, nevertheless suffer from the serious drawback of imparting a yellow discoloration to the detergent with which they are admixed, even in the customarily small amounts of .001 to 1% by weight. This is commercially very undesirable, and in fact detergents of pure white appearance are so strongly preferred in the trade that certain auxiliary agents, such as methyl umbelliferone, are often incorporated directly therein for the sole purpose of enhancing the whiteness of the detergent itself.

It is therefore a particularly striking advantage of the brighteners of the present invention, that they do not impair the whiteness of solid detergents. Actually in many cases they may enhance it in a manner similar to the above mentioned methyl umbelliferone; thus in effect combining two separate and highly useful properties—whitening of the detergent and whitening of the cloth—in a single compound.

Another notable advantage of these compounds over products used by the prior art for similar purposes is their superior chemical stability, particularly to chlorine bleaches. The importance of such property is quickly realized when one considers that chlorine bleaching is an operation almost universally associated with laundering or scouring.

These compounds also possess valuable properties other than as bleaching or whitening agents for white goods. For example, they may be used on colored textiles to enhance the color effect of many different dyes and pigments. Their mode of application for this purpose may vary: they may be used in a preliminary treatment of the fabric, applied with the dye, or applied as an after treatment.

Utilization of the compounds of this invention is not limited to treatment of textile fabrics. They may also be beneficially used in the manufacture of paper and felt products and in making transparent or translucent sheets or pellicles of cellulose or other origin. Their usefulness also extends to mutually compatible varnishes, plastic coatings and white or colored plastic shapes.

The compounds of the present invention may be prepared in a variety of ways. A sulfonated 3,7-diaminodibenzothiophene dioxide, and its substitution products such as the alkylated homologues and the halogenated, nitrated and oxygenated derivatives may be acylated in the normal manner with such acylating agents as acetic anhydride; butyryl chloride; trifluoroacetyl chloride; adipyl chloride; crotonyl chloride; ethoxyacetyl chloride; maleic anhydride; benzoyl and phenylacetyl chloride and the alkyl, halo, nitro, amino, and oxygenated substitution products thereof; the naphthoyl chlorides; phthalic anhydride; 2 - hydroxy - 3 - naphthoyl chloride; phenoxyacetyl chloride; cinnamic chloride; substituted carbanilyl chlorides; hydrocinnamoyl chloride; hexahydrobenzoyl chloride; cyclohexylacetyl chloride; furoyl chloride; nicotinyl chloride; picolinyl chloride; diethyl carbamyl chloride; cinchoninic acid chloride; and thiophene-alpha-carboxylic acid chloride. These acylating agents may be employed in a neutral or basic organic solvent or in an aqueous medium. A difunctional acylating agent, such as phosgene, may be used to link together two molecules of benzidine sulfone. By the proper choice of reagents and conditions, the 3- and 7-nitrogens may be substituted by the same or different acyl groups. Alternately, an unsulfonated 3,7-diaminodibenzothiophene dioxide and its above mentioned substitution products may be acylated with any of the acylating agents mentioned above, and the resulting 3,7-diacylaminodibenzothiophene dioxide may be sulfonated in a second step.

Thus it is evident that the sulfonic acid groups, which are necessary for the practical fulfillment of the invention, may be present in either the dibenzothiophene or the acyl nuclei, and that they may be introduced either before or after the acylation step. This will be further illustrated in conjunction with several specific examples given below.

The process of acylation before sulfonation is one of wide applicability. For the acylation the best choice of reaction conditions for a given case is somewhat dependent on the reactivity and stability of the reactants. It has been found that it is generally convenient to carry out the acylation of the unsulfonated diaminodibenzothiophene dioxide in an organic solvent at 100°–150°. The reaction is continued until the presence of primary amino groups is no longer detectable as, for example, by diazotization with nitrous acid.

For the introduction of the sulfonic groups following the acylation step, the conventional method of sulfonation with sulfuric acid may be used. However, it is frequently advantageous to use chlorosulfonic acid, with or without a solvent. This provides a smooth method of conducting the reaction, and tends to simplify the problem of isolating the product, which is obtained in high purity and good yield. For this reaction, it has been found that nitrohydrocarbons, such as nitromethane, nitropropane, and nitrobenzene, are highly suitable solvents; after completion of the reaction, the solvent is easily removed by steam distillation.

It has been found possible, by operating in a nitrohydrocarbon such as nitrobenzene, to first acylate the free dibenzothiophene dioxide diamine, and then to proceed immediately to the sulfonation with chlorosulfonic acid, without previous isolation. The ensuing sulfonation is advantageously conducted at room temperature or below. It is desirable to cool while the chlorosulfonic acid is added; frequently the sulfonation can then be completed around room temperature. When the sulfonation is finished, the reaction mixture is drowned in ice and water, and the solvent removed by steam distillation. The product is isolated in good yield and purity, either as the free sulfonic acid or a salt thereof. The salts are of equal technical importance to the free acids and are understood to be their obvious equivalents.

In the case where it is desired to acylate after sulfonation, one may start with an aminosulfonic acid of the dibenzothiophene dioxide series, obtainable for instance by the processes of copending applications of Robert S. Long and Sien Moo Tsang, Serial No. 168,379, filed June 15, 1950, and Sien Moo Tsang, Serial No. 184,707, filed September 13, 1950, both assigned to the assignee of the present application. With these amino sulfonic acids, it is advantageous to perform the acylation in an organic solvent with the aid of a tertiary amine or of substituted guanidine, according to the procedure of copending applications of Warren S. Foster and Mario Scalera, Serial No. 153,988, filed April 4, 1950, and Hans Z. Lecher and Dale R. Eberhart, Serial No. 153,992, filed April 4, 1950, also assigned to the assignee of the present application.

It has been observed that when it is desired to produce a sulfonated derivative of this class bearing the sulfonic groups in the dibenzothiophene dioxide ring, the process of sulfonation before acylation, offers a sure way of obtaining the desired compound. The process of sulfonation following acylation generally produces sulfonated derivatives which carry the sulfonic group or groups in the outer acyl rings, provided, of course, such acyl rings are of the aromatic type, and capable of sulfonation. Thus, by the two processes hereinbefore described it is possible to prepare all types of products broadly disclosed in the present application.

The invention will be discussed more fully in conjunction with the accompanying examples which are furnished by way of illustration. Except as otherwise noted all parts are parts by weight, and all temperatures are in degrees centigrade.

*Example 1*

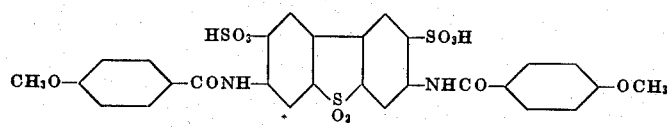

To 3 parts by weight of dry 3,7-diaminodibenzothiophene-5,5'-dioxide - 2,8 - disodium sulfonate are added 7.7 parts of p-anisoyl chloride and ¼ to ½ part of pyridine. The mixture is stirred and heated to 150°-160° C., cooled, diluted with acetone, filtered, washed, suspended in hot, dilute $Na_2CO_3$ solution, filtered, washed and dried to give a light brown product dissolving in water to a strongly blue fluorescent solution. The product is valuable for whitening cellulosic and other materials.

*Example 2*

If, in the procedure of the above example, the anisoyl chloride is substituted by p-toluyl chloride, the di-p-toluyl derivative is obtained as a light yellow product. It has a similar shade of fluorescence.

*Example 3*

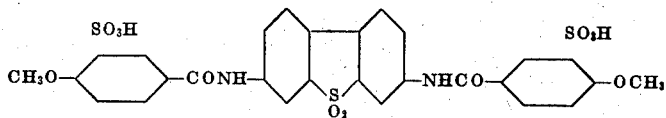

To 12.3 parts of 3,7-diaminodibenzothiophene-5,5'-dioxide in 90 parts of nitrobenzene are added 20.4 parts of p-anisoyl chloride at 100°-150° C. The mixture is stirred at 150° C. until primary amino groups can no longer be detected, then cooled and 117 parts of chlorosulfonic acid added during 30 minutes at 10°-20° C. The mixture is stirred at 18°-20° C. until the reaction is complete.

The mixture is drowned in a mixture of ice and 50 g. salt, filtered, the cake neutralized and nitrobenzene steamed off, or the drowned mixture may be neutralized directly and steam-stripped. After filtration, washing and drying, a light yellow product is obtained, soluble in water to a blue fluorescent solution.

This product on hydrolysis regenerates unsulfonated 3,7-diaminodibenzothiophenedioxide and a sulfonated benzoic acid, thus indicating that the sulfonic acid groups are introduced in the acyl rings and not in the dibenzothiophene nucleus. The product is a very effective whitening agent, showing strong affinity for vegetable fibers, and a bright bluish white fluorescence on such fibers.

*Example 4*

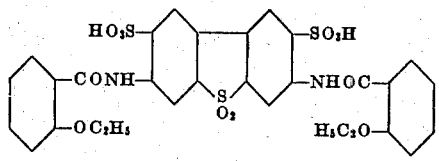

3,7-diaminodibenzothiophenedioxide - 2,8 - disulfonic acid is dissolved in dilute sulfuric acid and treated with triethylamine. The triethylamine salt crystallizes from the cold solution, and is filtered and dried. A slurry of 30.4 parts of the resulting salt in 133 parts of chlorobenzene and 30.3 parts of triethylamine is heated under reflux with stirring and to it is added during about 30 minutes 27.7 parts of ortho-ethoxybenzol chloride. The reaction mixture is heated under reflux for four hours and then treated with an additional portion of 30.3 parts of triethylamine and 27.7 parts of ortho-ethoxybenzoyl chloride.

Refluxing and stirring are continued overnight. The chlorobenzene and triethylamine are removed by steam distillation after adding sufficient sodium carbonate to render the mixture alkaline to brilliant yellow. The product is isolated in excellent yield in the usual manner by filtration, washing with 2% brine and drying.

*Example 5*

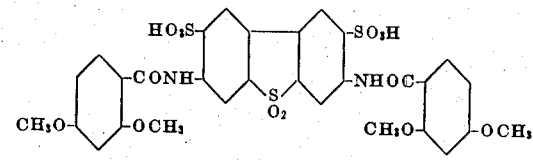

A slurry of 122 parts of 3,7-diaminodibenzothiophenedioxide-2,8-disulfonic acid, 157 parts of pyridine, and 1110 parts of monochlorobenzene is heated at reflux and treated with a solution of 185 parts of 2,4-dimethoxybenzoyl chloride in 220 parts of chlorobenzene. After three hours at reflux, 250 parts of sodium carbonate are added, and the mixture is steamed free of pyridine and chlorobenzene, salted with 5% its weight of sodium chloride, cooled to 15° C. and filtered. The cream-colored cake after washing with 2% brine and drying at 90° C. represents an excellent yield of 3,7-di-(2,4-dimethoxybenzoylamino)-dibenzothiophenedioxide-2,8-disodium sulfonate.

Example 6

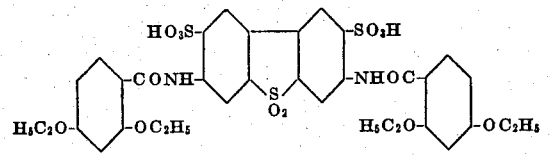

The trimethylamine salt of 3,7-diaminodibenzothiophenedioxide-2,8-disulfonic acid is prepared by treatment with excess of 30% aqueous trimethylamine solution and evaporation to dryness. The salt is acylated by heating with 2,4-diethoxybenzoyl chloride in chlorobenzene, as described in Example 2. The mixture is then treated with soda ash and steam distilled to remove chlorobenzene and trimethylamine. The addition of sodium chloride salts out an excellent yield of 3,7 - di(2,4 - diethoxybenzoylamino) dibenzothiophenedioxide-2,8-disulfonic acid.

Example 7

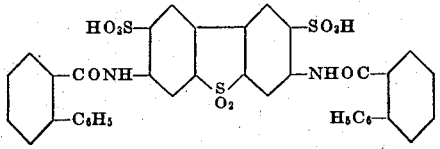

3,7-diaminodibenzothiophenedioxide-2,8-disulfonic acid is dissolved in dilute sulfuric acid and treated with triethylamine. The triethylamine salt crystallizes from the cold solution, and is filtered and dried. 15.2 parts of the salt is slurried in 10 parts of pyridine and 110 parts of chlorobenzene. After heating to reflux, the mixture is gradually treated with 20.2 parts of o-phenyl-benzoyl chloride. Heating and stirring are continued until acylation is complete. The resulting slurry is made alkaline with aqueous sodium carbonate and steam distilled to remove the solvents. The product is then salted out with sodium chloride, filtered, washed with brine, and dried.

Example 8

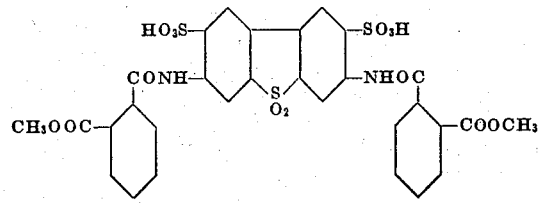

A mixture of 10.4 parts of pyridine, 83 parts of chlorobenzene, and 10.1 parts of the triethylamine salt of 3,7-diaminodibenzothiophenedioxide-2,8-disulfonic acid is heated to reflux and treated with 15.9 parts of o-carbomethoxybenzoyl chloride. When acylation is completed, the solid product is separated, dissolved in aqueous sodium carbonate and salted out with sodium chloride. It is then filtered and dried.

Example 9

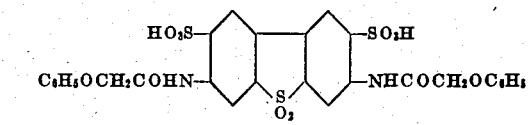

A mixture of 145 parts of chlorobenzene, 16 parts of pyridine, and 15.2 parts of the triethylamine salt of 3,7-diaminodibenzothiophenedioxide-2,8-disulfonic acid is heated to reflux and gradually treated with 15.4 parts of phenoxyacetyl chloride. When acylation is complete the mixture is cooled, made alkaline with sodium carbonate, and subjected to steam distillation. The product is salted out in the usual way and filtered.

Example 10

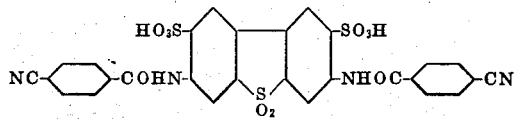

A mixture of 16 parts of pyridine, 145 parts of chlorobenzene, and 15.2 parts of the triethylamine salt of 3,7-diaminodibenzothiophenedioxide-2,8-disulfonic acid is heated to reflux and gradually treated with 16.7 parts of p-cyanobenzoyl chloride. After three hours of stirring and refluxing, the mixture is cooled, made alkaline with sodium carbonate solution, and subjected to steam distillation. The bright yellow product is then salted out with sodium chloride, filtered, washed with brine, and dried. It is obtained in excellent yield.

Example 11

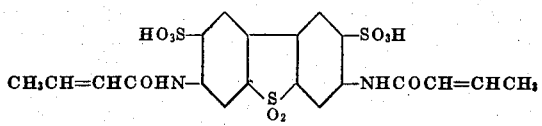

A mixture of 145 parts of chlorobenzene, 16 parts of pyridine, and 15.2 parts of the triethylamine salt of 3,7-diaminodibenzothiophenedioxide-2,8-disulfonic acid, is heated to reflux and treated gradually with 10.8 parts of crotonyl chloride. The mixture is stirred and heated until acylation is complete, then made alkaline with sodium carbonate solution and steam distilled to remove the solvents. The addition of sodium chloride salts out the product as a bright yellow solid, which is filtered and dried.

Example 12

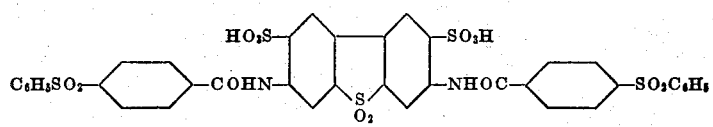

A slurry of 7.6 parts of the triethylamine salt of 3,7-diaminodibenzothiophenedioxide-2,8-disulfonic acid, in 10 parts of pyridine, and 225 parts of chlorobenzene, is heated to 80° and treated slowly with 12.7 parts of p-phenylsulfonylbenzoyl chloride. Acylation is completed at reflux temperature, the mixture then being treated with aqueous sodium carbonate and steam distilled free of pyridine. The yellow product is salted out by the addition of sodium chloride, filtered, washed, and dried.

Example 13

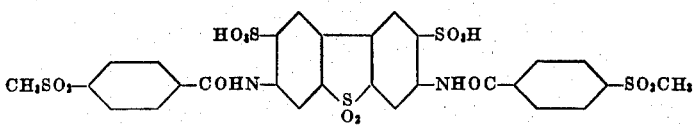

10.1 parts of the triethylamine salt of 3,7-diaminodibenzothiophenedioxide - 2,8 - disulfonic acid is slurried in 275 parts of chlorobenzene and 15 parts of pyridine and heated to reflux. To this is gradually added 11.3 parts of p-methylsulfonylbenzoyl chloride. When acylation is complete, the mixture is treated with aqueous sodium carbonate and steam distilled free of pyridine. The yellow product is salted out with sodium chloride and filtered and dried.

Example 14

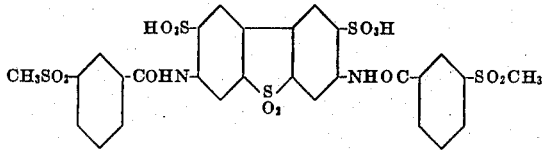

The procedure of the preceding example is followed, using m-methylsulfonylbenzoyl chloride instead of the p-isomer. The product is similar.

Example 15

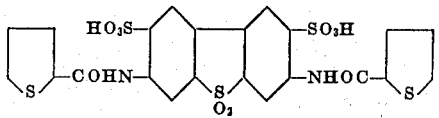

A mixture of 15.2 parts of the triethylamine salt, prepared as described above, 150 parts of chlorobenzene, and 15.8 parts of pyridine is stirred and refluxed and gradually treated with 13.2 parts thiophene-2-carboxylic acid chloride. After stirring and refluxing for three hours the mixture is worked up in the usual manner, giving a product of pale yellow color.

Example 16

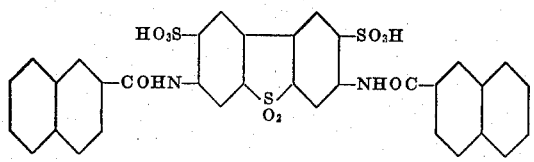

A mixture of 250 parts of pyridine and 15.2 parts of the triethylamine salt prepared as described in the above examples, is stirred and refluxed while being treated with 17.2 parts of 2-naphthoylchloride dissolved in 22 parts of benzene. The pyridine is removed by steam distillation in the presence of aqueous sodium carbonate, and the pale yellow product isolated in the usual manner.

Example 17

The 1-naphthoyl isomer is prepared in the same manner, substituting 1-naphthoic acid for the 2-naphthoic acid. Its properties are essentially similar.

Example 18

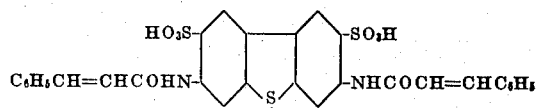

A solution is prepared from 26.3 parts of di-o-tolylguanidine, 11.9 parts of concentrated hydrochloric acid, and water to the volume of 200 parts of water. This is slowly added to a solution prepared by adding 20.3 parts of 3,7-diaminodibenzothiophenedioxide-2,8-disulfonic acid to 100 parts of water, neutralizing with 5 N sodium hydroxide solution, and diluting to the volume of 200 parts of water. The salt which crystallizes out is filtered, washed, and dried.

A mixture of 24 parts of nitrobenzene and 4.4 parts of the above prepared di-o-tolylguanidine salt is heated to 120° and treated with 2.5 parts of cinnamoyl chloride. The mixture is then heated further to 140° to complete the reaction, cooled to 85°, and treated with a solution of 1.9 parts of phenol in 5 parts of 5 N sodium hydroxide. The resulting bright yellow precipitate is filtered, washed with nitrobenzene and acetone and dried.

Example 19

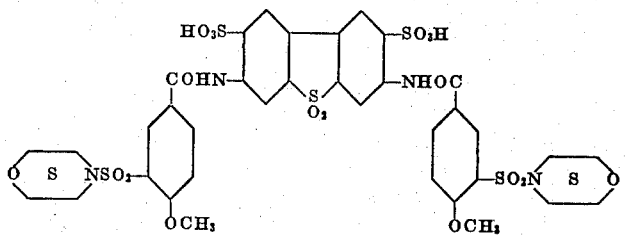

15.2 parts of p-anisic acid is added gradually to 58 parts of chlorosulfonic acid at 5–11° C. After one-half hour the mixture is gradually warmed to 75° and maintained at this temperature one hour. It is then cooled, drowned in ice, and filtered. 10 parts of the resulting sulfonyl chloride is treated with 8 parts of morpholine. The reaction mixture is slowly treated with 5 N sodium hydroxide, the temperature rising to 25°. After acidification with hydrochloric acid, the p-anisic acid m-sulfon morpholide is filtered. It melts at 218–9°.

2.6 parts of this product is converted to the corresponding carboxylic acid chloride by treatment with 1.6 parts of thionyl chloride, in the usual manner. This is then added to a mixture of 12 parts of nitrobenzene and 2.2 parts of the di-o-tolyguanidine salt prepared as in Example 18. After twenty minutes at 140–5°, the mixture is treated with a solution of 0.9 part of phenol in 2 parts of 5 N sodium hydroxide, with immediate formation of a yellow precipitate. The product is filtered in the hot, washed with nitrobenzene followed by acetone, and dried.

Example 20

The analogous disulfonanilide, which has similar properties, is obtained in a similar way, substituting aniline for morpholine in the above procedure.

Example 21

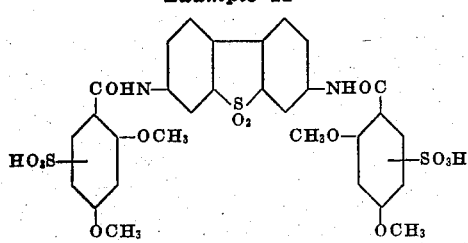

3.6 parts of 2,4-dimethoxybenzoic acid is converted to acid chloride by treatment in the usual way with 2.6 parts of thionyl chloride in the presence of 8 parts of pyridine. This is added at 30° to a solution of 2.0 parts of 3,7-diaminodibenzothiophenedioxide in 49 parts of pyridine. The product precipitates out and is filtered, washed with alcohol and water, and dried. Sulfonation is effected by adding 2.7 parts of the resulting product to 11–12 parts of chlorosulfonic acid at minus 8° to 0° C. and stirring for one and one-half hours at a maximum temperature of 15°. The mixture is then drowned in ice and filtered and washed. The product is slurried in water, neutralized with sodium hydroxide solution, filtered, and dried at 110°.

Example 22

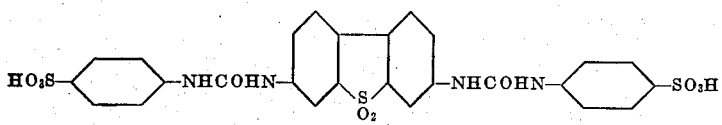

A mixture of 2.5 parts of 3,7-diaminodibenzothiophenedioxide and 5.7 parts of phenyl isocyanate is heated at 125–30° until reaction is complete as shown by the disappearance of free amino groups. The reaction mixture is then diluted with acetone, filtered, washed with acetone, and dried. 4.4 parts of the resulting product is gradually added at approximately minus 5° to 21.2 parts of chlorosulfonic acid. After two hours at 0–5°, the mixture is drowned in ice, salted with sodium chloride, filtered, and washed with brine. It is then dissolved in 75 parts of soda ash solution, salted with 20 parts of sodium chloride, heated to 80–90°, filtered, washed with brine, and dried.

Example 23

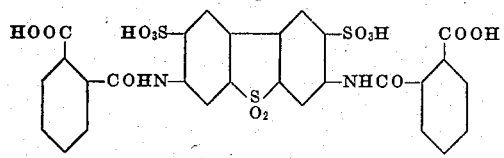

A mixture of 3 parts of phthalic anhydride and 1.1 parts of the di-o-tolylguanidine salt, prepared as in Example 18, is fused to a maximum temperature of 220°. The mixture is cooled to 55° and treated with a small quantity of nitrobenzene followed by 6 parts of 10 N sodium hydroxide and 6 parts of alcohol to precipitate the yellow solid product, which is dried at 110°.

Example 24

An illustration of the incorporation of compounds of this invention in detergents is the following:

A paste is prepared from 5000 parts of water and 10,000 parts of a commercial detergent powder, containing as its active ingredient approximately 35% on a dry weight basis of a sodium alkylarylsulfonate, combined with major proportions of sodium tripolyphosphate and sodium sulfate, and minor amounts of sodium silicate and sodium chloride. This paste is heated on a water bath and into it is stirred 6 parts of the 3,7-dianisoylaminodibenzothiophenedioxide-2,8-disodium sulfonate, prepared as in Example 1, followed by an additional 5000 parts of hot water. When mixing is complete, the paste is dried at 90° C. to a powder, which is conditioned for twenty-four hours at 30° and a relative humidity of 88%. The product thus obtained, which has a moisture content of 5–10%, and a brightener content of .06% on a dry weight basis, corresponds in composition to commercial detergent-brightener products, and effectively restores white shades when used to launder cotton goods which are yellow with age. The detergent product itself is pure white in color, being unaffected in appearance by the presence of the brightener substance.

Example 25

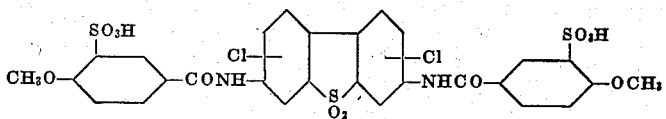

To 677 parts of 35% oleum is gradually added 105.3 parts of 3,3'-dichlorobenzidine sulfate, the temperature being maintained below 20°. The mixture is heated to 60° C. and maintained at this temperature three hours. It is then drowned in 1500 parts of ice and water. The precipitate is thoroughly washed, and then dried at 75° C. This is the dichlorodiamino dibenzothiophene dioxide of the probable formula:

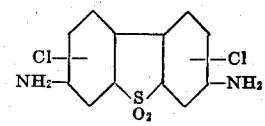

the position of the sulfone bridge not being clearly established.

Acylation is carried out as follows: To a stirred suspension of 15.8 parts of the above prepared compound in 147 parts of pyridine, there is gradually added 34.5 parts of anisoyl chloride. The resulting mixture is then refluxed until acylation is complete, as shown by the disappearance of primary amine groups. The reaction mixture is drowned in 200 parts of water containing 20 parts of sodium carbonate, and filtered. The cake is thoroughly washed and dried at 75° C.

Sulfonation is carried out by forming a suspension of 16.1 parts of the above prepared compound in 120 parts of nitrobenzene and gradually treating with 5.9 parts of chlorosulfonic acid. The mixture is stirred for one-half hour at about 35° C. and then heated to 120° C. and kept at this temperature for one-half hour. The product is isolated by drowning in ethanol, filtering, and washing. It is a light-straw color powder, soluble in water, and having marked substantivity for cellulosic fibers, to which it imparts a bright blue fluorescence under ultraviolet light.

Example 26

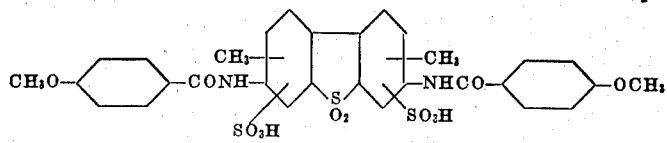

93.0 parts of tolidine sulfate is gradually added to 677.5 parts of 25% oleum, the temperature being kept below 40° C. The mixture is then heated to 60° C. over a one hour period, stirred at this temperature for 3 hours, then heated to 120° C., kept at this temperature 2½ hours, and finally heated for one-half hour at 140° C. The reaction mixture is drowned in 2000 parts of water. The yellow disulfonic acid is filtered, washed, and dried. This intermediate has the probable formula:

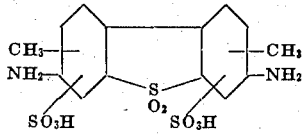

The exact location of all the substituents has not been determined.

21.7 parts of the disulfonic acid so-prepared is dissolved in 196 parts of dry pyridine, treated with 26.0 parts of anisoyl chloride, and refluxed for 3 hours. The mixture is then steam distilled in the presence of sodium carbonate, to remove pyridine. The light colored precipitate remaining is filtered, washed with 5% sodium chloride solution followed by ice water, and dried.

Example 27

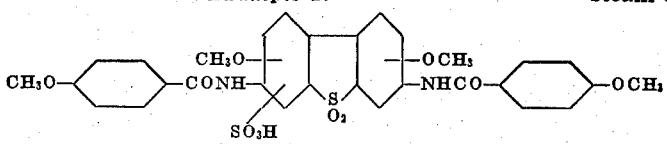

244 parts of dianisidine is slurried in 315 parts of glacial acetic acid and gradually treated with 236 parts of acetic anhydride. Acetylation is completed by refluxing, the mixture being cooled and filtered. The product, diacetyl dianisidine, melts at about 243° C. after being washed with alcohol.

32.8 parts of the above prepared diacetyl dianisidine is gradually dissolved in 330 parts of 35% oleum at 15–30° C. The solution is slowly heated to 60° C. and stirred at this temperature for three hours. The resulting dark red solution is drowned in 1600 parts of ice and water. The resulting solution is heated to 95–100° C. for one hour, cooled to room temperature, and filtered. The yellow product is washed with ethanol and dried.

Acylation is effected by heating at 100° C. for one hour a mixture of 5.1 parts of the above prepared compound, 29.3 parts of pyridine, and 6.9 parts of anisoyl chloride. The reaction mixture is drowned in 100 parts of water, made alkaline with 10% sodium carbonate solution, and the product filtered, washed, and dried. When treated with an aqueous solution of this product, cotton cloth acquires an intense greenish-blue fluorescence under ultraviolet light.

Example 28

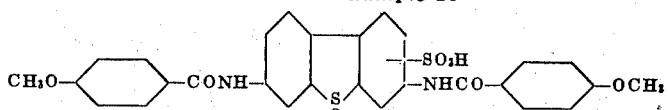

A mixture of 28.2 parts of benzidine sulfate and 211.2 parts of 26.8% oleum is heated at 70° C. for 2 hours, cooled to about 40° C., and treated with 46.0 parts of 86.3% sulfuric acid. The mixture is then heated to about 140° C., stirred at this temperature for about 18 hours, and finally for 2 hours at about 180° C. The reacted mixture is drowned in 1,000 parts of water, cooled, and filtered. The filter cake is slurried in 500 parts of water, neutralized to a pH of 7 by the addition of triethylamine, and filtered. On acidification with 5 N sulfuric acid, the 3,7-diaminodibenzothiophenedioxide - 2 - sulfonic acid separates from solution. The resulting mixture is filtered at the boil, and the product washed with water and dried.

A mixture of 12.8 parts of the above prepared product, 110 parts of chlorobenzene, 25 parts of pyridine, and 31 parts of anisoyl chloride is refluxed for 24 hours, or until acylation is complete, as shown by the disappearance of primary amino groups. The reaction mixture is then freed of pyridine and chlorobenzene by steam distillation in the presence of sodium carbonate. The product is salted out with sodium chloride, washed with 2% brine, and dried at 100° C. An excellent yield of a pale colored solid is obtained. The product is sparingly soluble in water, and shows, even from very dilute solutions, a marked affinity for cellulosic fibers, to which it imparts a bright bluish-white fluorescence under ultraviolet irradiation.

Example 29

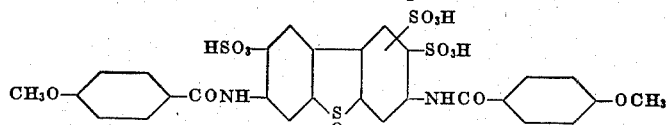

A mixture of 14.1 parts of benzidine sulfate and 113 parts of 25% oleum is heated at 70° C. for two hours, then rapidly heated to 140° C. and maintained at this temperature for 3 hours. It is then drowned in 600 parts of ice, followed by 10.1 parts of triethylamine and 500 parts of water. The solution is cooled and filtered to remove the triethylamine salt of the disulfonic acid. The filtrate is then evaporated to 138 parts and the separated solid filtered and dissolved in 100 parts of water containing excess triethylamine. The excess is then boiled out and the solution acidified with 5 N sulfuric acid and cooled, resulting in the deposition of needle-like crystals of triethylamine salt of the trisulfonic acid. The yield is increased by evaporation. The salt, of the probable formula

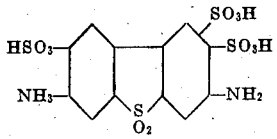

is recrystallized from water.

To a stirred refluxing slurry of 5.6 parts of the above prepared triethylamine salt, 77 parts of chlorobenzene, and 6.7 parts of pyridine, is gradually added 6.9 parts of anisoyl chloride. Stirring and refluxing are continued until acylation is complete. The mixture is then freed of solvents by steam distillation in the presence of sodium carbonate, and the cream-yellow product salted out of solution by the addition of sodium chloride.

*Example 30*

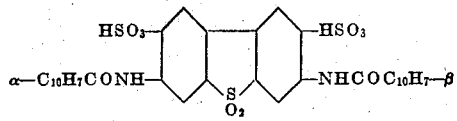

14.6 parts of 3,7-diaminodibenzothiophene-2,8-disulfonic acid triethylamine salt is added to 17.2 parts of mixed α and β naphthoyl chloride in 49 parts of dry pyridine. The mixture is heated at reflux for a half hour, diluted with 100 parts of water containing 20 parts of soda ash and 20 parts of salt and steamed free of pyridine. The solid is filtered off and washed with dilute brine and finally ice water. There results an excellent yield of product.

*Example 31*

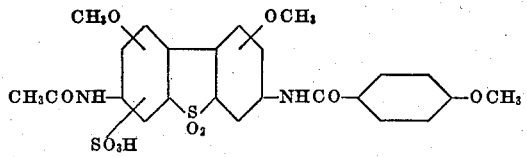

66 parts of diacetyl dianisidine (as prepared in Example 27) is gradually added to 660 parts of 35% oleum, then slowly heated to 60° C., kept at this temperature three hours, and drowned in 3000 parts of ice and water. After one hour at 15° C., a colorless precipitate forms, which is filtered out. Higher temperatures should be avoided to prevent hydrolysis of the monoacetyl group. The product is filtered and washed with ethanol followed by benzene. It is dried at 75° C.

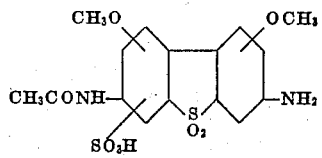

A mixture of 8.6 parts of the above-prepared compound, 80 parts of pyridine, and 6.9 parts of p-anisoyl chloride is refluxed until acylation is complete. The reaction mixture is then drowned in a solution of sodium chloride and sodium carbonate, containing enough ice to keep the temperature in the range 10 to 15° C. The light yellow product is filtered, washed with brine, and dried at 75° C. It imparts fluorescence to cotton cloth.

We claim:

1. A sulfonated dibenzothiophene dioxide selected from the group of sulfonic acids and sulfonates of the formula

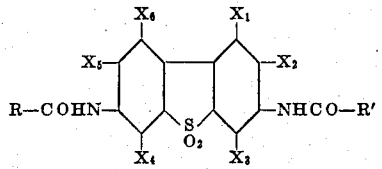

wherein RCO— and R'CO are carboxylic acyl radicals and $X_1$, $X_2$, $X_3$, $X_4$, $X_5$, and $X_6$ are selected from the group consisting of the H, sulfonic, halogen, lower alkyl and lower alkoxy radicals, at least one of R and R' containing a sulfonic radical when none of the X's are sulfonic radicals.

2. A sulfonated dibenzothiophene dioxide according to claim 1 in which the carboxylic acyl radicals are of aromatic carboxylic acids.

3. A compound according to claim 2 in which at least one of the carboxylic acyl radicals contains a sulfonate substituent.

4. A compound according to claim 2 in which the dibenzothiophene nucleus contains at least one $SO_3H$ substituent.

5. A compound of the formula

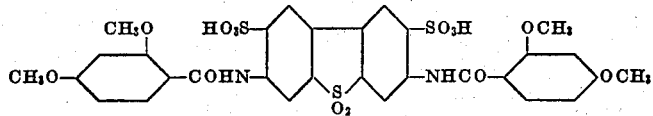

and its salts.

6. A compound of the formula

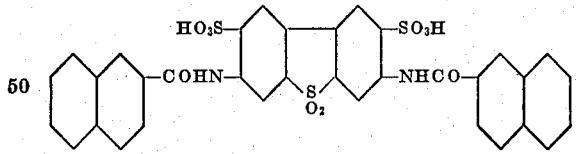

and its salts.

7. A compound of the formula

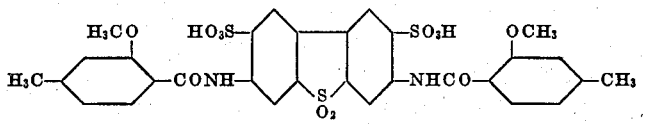

and its salts.

MARIO SCALERA.
DALE R. EBERHART.

REFERENCES CITED

The following references are of record in the file of this patent:

UNITED STATES PATENTS

| Number | Name | Date |
|---|---|---|
| 1,324,764 | Wald | Dec. 9, 1919 |
| 2,089,413 | Paine | Aug. 10, 1937 |
| 2,149,335 | Dahlen | Mar. 7, 1939 |
| 2,189,367 | Muth | Feb. 6, 1940 |
| 2,424,778 | Tainsh | July 29, 1947 |